(12) United States Patent
Nakajima et al.

(10) Patent No.: US 8,680,796 B2
(45) Date of Patent: Mar. 25, 2014

(54) CONTROL DEVICE AND CONTROL METHOD FOR POWER CONVERTER

(75) Inventors: Kenji Nakajima, Chiyoda-ku (JP); Masato Mori, Chiyoda-ku (JP); Kenichi Akita, Chiyoda-ku (JP); Mitsunori Tabata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 50 days.

(21) Appl. No.: 13/443,361

(22) Filed: Apr. 10, 2012

(65) Prior Publication Data

US 2013/0093366 A1    Apr. 18, 2013

(30) Foreign Application Priority Data

Oct. 18, 2011    (JP) .................................. 2011-228963

(51) Int. Cl.
*H02P 1/00*    (2006.01)
(52) U.S. Cl.
USPC ........... 318/139; 318/801; 318/727; 318/146; 318/151; 318/158
(58) Field of Classification Search
USPC ......... 318/139, 801, 727, 146, 151, 158, 453, 318/465, 504
See application file for complete search history.

(56) References Cited

U.S. PATENT DOCUMENTS

| | | | |
|---|---|---|---|
| 7,528,585 B2* | 5/2009 | Maehara | 322/59 |
| 8,339,074 B2* | 12/2012 | Nakajima et al. | 318/139 |
| 2007/0132409 A1* | 6/2007 | Wada et al. | 318/146 |
| 2008/0190680 A1* | 8/2008 | Kaneko et al. | 180/170 |
| 2010/0072958 A1* | 3/2010 | Wada et al. | 322/22 |
| 2010/0087974 A1* | 4/2010 | Nakajima et al. | 701/22 |

FOREIGN PATENT DOCUMENTS

| | | |
|---|---|---|
| JP | 2007-295659 A | 11/2007 |
| JP | 2010-81709 A | 4/2010 |
| JP | 2010-88239 A | 4/2010 |
| JP | 2010-259216 A | 11/2010 |
| JP | 2011-166910 A | 8/2011 |

OTHER PUBLICATIONS

Japanese Office Action (Preliminary Notice of Reasons for Rejection), Aug. 20, 2013, Application No. 2011-228963.

* cited by examiner

*Primary Examiner* — Eduardo Colon Santana
*Assistant Examiner* — Bickey Dhakal
(74) *Attorney, Agent, or Firm* — Sughrue Mion, PLLC (57) ABSTRACT

To provide an upper limit of a generated voltage or generated torque, to thereby prevent the occurrence of an overvoltage or excessive torque during power generation, a control selection section (308) chooses and outputs a minimum value between a control output of a generated voltage control section (306) for controlling a field current so that a B-terminal voltage of a polyphase AC generator-motor coincides with a generated voltage command and a control output of a generated torque control section (307) for controlling, based on the B-terminal voltage and a rotation speed, the field current so that generated torque of the polyphase AC generator-motor coincides with a generated torque command.

4 Claims, 9 Drawing Sheets

CONTROL DEVICE AND CONTROL METHOD FOR POWER CONVERTER

BACKGROUND OF THE INVENTION

1. Field of the Invention

The present invention relates to a control device and a control method for a power converter to be used by being connected to a field winding type rotary generator-motor including an armature winding and a field winding, the power converter being mounted mainly on a vehicle and operable as an electric motor at the time of starting an engine and as a power generator after the start of the engine.

2. Description of the Related Art

In recent years, for environmental protection and fuel economy improvement, a so-called hybrid car including an engine and another power source such as a rotary generator-motor has been developed for practical use. In this type of vehicle, the engine and another power source are used for different running situations.

Idle reduction, for example, is a technology for reducing unnecessary fuel consumption during idling. In the idle reduction technology, an internal combustion engine is stopped when a vehicle stops at a traffic light or in other situations, and the internal combustion engine is restarted by a rotary generator-motor in response to the detection of a driver's intention to start moving, such as stepping on the accelerator or releasing the brake.

The rotary generator-motor mountable in this type of vehicle is mounted in a manner that can transfer torque to the engine. The rotation speed of the rotary generator-motor thus greatly changes by the driver's accelerator pedal operation and the influence of friction of the engine. As a configuration in which an induced voltage of the rotary generator-motor can be controlled independently of the rotation speed of the engine, there has been adopted a field winding type rotary generator-motor capable of control by a field current instead of using a rotor incorporating a permanent magnet.

In the case of using a rotary generator-motor mounted on a vehicle as a power generator, torque is generated in the engine coupled to the power generator in accordance with the amount of power generation. When the rotation speed is constant, the generated torque increases as the amount of power generation becomes larger. Thus, immediately after the start of the engine by a starter, the amount of power generation is large and the generated torque is also large, and hence the engine may stall immediately after started. In addition, when the generated torque increases during idling due to load fluctuations, the engine may stall because output torque of the engine is low.

To prevent the engine stalling, there has been proposed a field winding type synchronous generator-motor that estimates generated load torque to be applied to the engine at the time of power generation and controls a field winding current of a rotary electric machine so that the generated load torque may be a predetermined value (see, for example, Japanese Patent Application Laid-open No. 2010-81709).

Japanese Patent Application Laid-open No. 2010-81709 discloses no specific conditions as to the selection between generated voltage control and generated torque control. Alternatively, there has been proposed a control device for a power converter, which chooses any one of the generated voltage control and the generated torque control depending on an external command or the load on the power converter so as to suppress fluctuations in generated torque and prevent excessive power generation (see, for example, Japanese Patent Application Laid-open No. 2011-166910).

Generally, the power generator mounted on a vehicle performs generated voltage control so that the voltage of a power source electrically connected to the power generator may be a predetermined value.

In Japanese Patent Application Laid-open No. 2011-166910, however, in the mode of controlling the generated voltage, the generated voltage of the power generator is controlled based on a generated voltage command so as to follow the generated voltage command, while the torque generated by the power generator is not controlled at all and depends on the amount of power generation. As a result, the engine may stall in the state in which the engine output is unstable, such as immediately after the start of the engine, and during idling in which the engine output torque is small.

In the mode of controlling the generated torque, on the other hand, a field current is calculated in accordance with a generated torque command, the rotation speed, and a B-terminal voltage so as to generate a desired torque, and the calculated desired field current is supplied to a field coil to generate the desired torque. The voltage generated by the power generator is therefore not controlled at all and depends on the amount of power generation. Thus, an overvoltage may occur when the generated torque is large.

SUMMARY OF THE INVENTION

The present invention has been made to solve the problems described above, and it is therefore an object thereof to provide a control device and a control method for a power converter, which are used in a field winding type synchronous generator-motor including a field winding and in which a minimum value between a control output for generated voltage control and a control output for generated torque control is output so as to provide an upper limit of a generated voltage or generated torque, to thereby prevent the occurrence of an overvoltage or excessive torque during power generation.

According to the present invention, there is provided a control device for a power converter to be used by being connected to a polyphase AC generator-motor including an armature winding and a field winding, the polyphase AC generator-motor including: a power conversion section; and a control device for controlling ON/OFF of switching elements of the power conversion section, the power conversion section including: a bridge circuit including positive-arm switching elements and negative-arm switching elements, for controlling energization of the armature winding; and a field circuit for controlling energization of the field winding by using a field switching element, the control device including: a B-terminal voltage detection section for detecting a B-terminal voltage generated between a B-terminal and a reference potential, the B-terminal being an input/output terminal for power of the polyphase AC generator-motor; a field current detection section for detecting a field current flowing through the field winding; a rotation speed calculation section for detecting a rotation speed of the polyphase AC generator-motor; a generated voltage control section for controlling the field current so that the B-terminal voltage of the polyphase AC generator-motor coincides with a generated voltage command; a generated torque control section for controlling, based on the B-terminal voltage and the rotation speed, the field current so that generated torque of the polyphase AC generator-motor coincides with a generated torque command; a control selection section for choosing any one of a control output of the generated voltage control section and a control output of the generated torque control section; and a field current control section for controlling the field current so that the field current coincides with an output of the control selection section, in which the control selection section includes a minimum value selection section for choosing and outputting a minimum value between the control output of the generated voltage control section and the control output of the generated torque control section.

According to the present invention, there is provided a control method for a power converter to be used by being connected to a polyphase AC generator-motor including an armature winding and a field winding, the control method including: a B-terminal voltage detection step of detecting a B-terminal voltage generated between a B-terminal and a reference potential, the B-terminal being an input/output terminal for power of the polyphase AC generator-motor; a field current detection step of detecting a field current flowing through the field winding; a rotation speed calculation step of detecting a rotation speed of the polyphase AC generator-motor; a generated voltage control step of controlling the field current so that the B-terminal voltage of the polyphase AC generator-motor coincides with a generated voltage command; a generated torque control step of controlling, based on the B-terminal voltage and the rotation speed, the field current so that generated torque of the polyphase AC generator-motor coincides with a generated torque command; a control selection step of choosing any one of a control output in the generated voltage control step and a control output in the generated torque control step; and a field current control step of controlling the field current so that the field current coincides with an output in the control selection step, in which the control selection step includes a minimum value selection step of choosing and outputting a minimum value between the control output in the generated voltage control step and the control output in the generated torque control step.

According to the control device and the control method for a power converter of the present invention, the control selection section chooses and outputs the minimum value between the control output of the generated voltage control section for controlling the field current so that the B-terminal voltage of the polyphase AC generator-motor coincides with the generated voltage command and the control output of the generated torque control section for controlling, based on the B-terminal voltage and the rotation speed, the field current so that the generated torque of the polyphase AC generator-motor coincides with the generated torque command.

Therefore, in the field winding type synchronous generator-motor including the field winding, the minimum value between the control output for generated voltage control and the control output for generated torque control is output so as to provide an upper limit of the generated voltage or the generated torque, to thereby prevent the occurrence of an overvoltage or excessive torque during power generation.

DETAILED DESCRIPTION OF THE PREFERRED EMBODIMENTS

Referring to the drawings, a control device and a control method for a power converter according to exemplary embodiments of the present invention are described below. In the drawings, the same or equivalent parts are denoted by the same reference symbols for description.

First Embodiment

Figure 1:
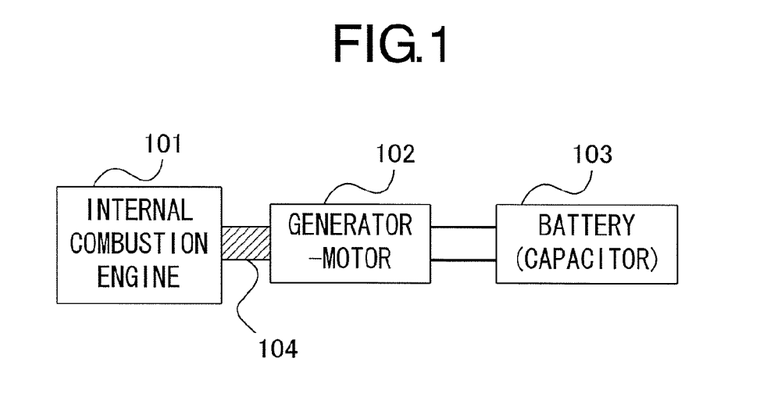
FIG. 1 is an overall explanatory diagram of a vehicle system in which a field winding type generator-motor as a rotary electric machine is mounted on a vehicle.
Figure 2:
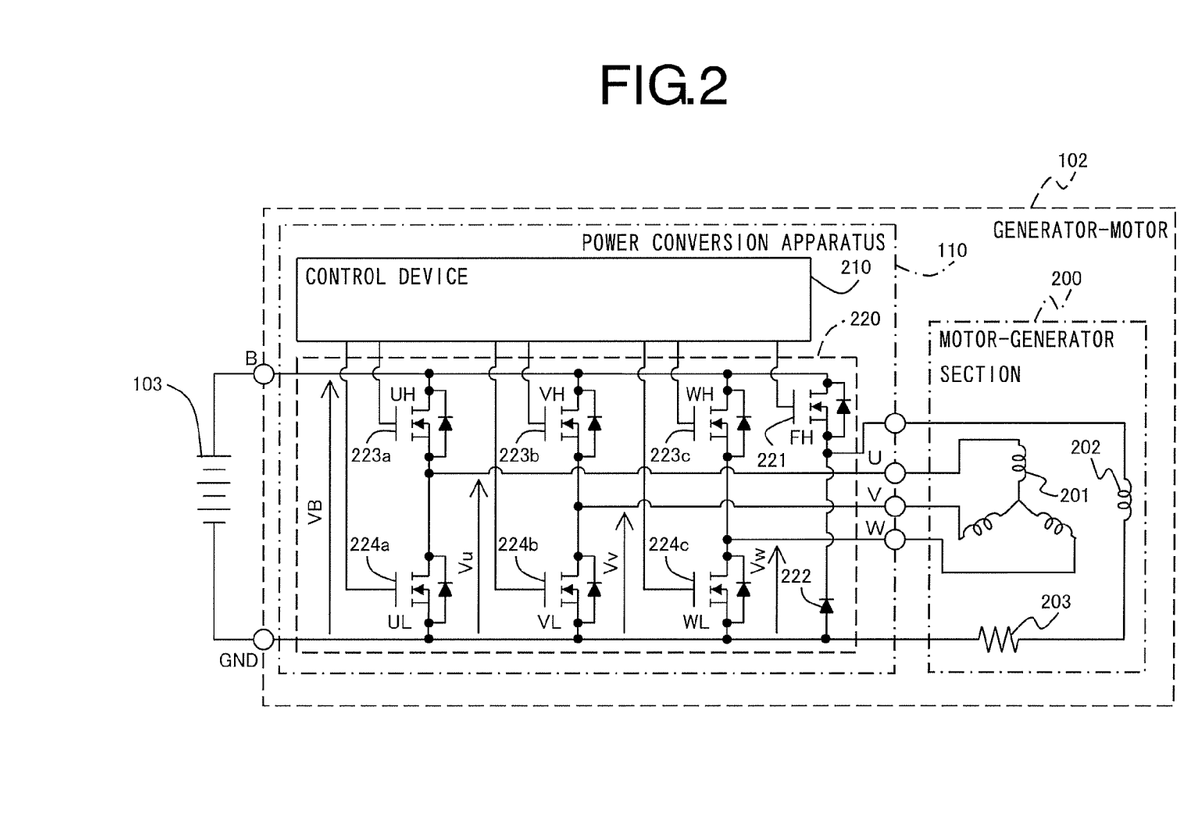
FIG. 2 is a configuration diagram illustrating a configuration of a generator-motor including a control device for a vehicle power converter according to a first embodiment of the present invention.
Figure 3:
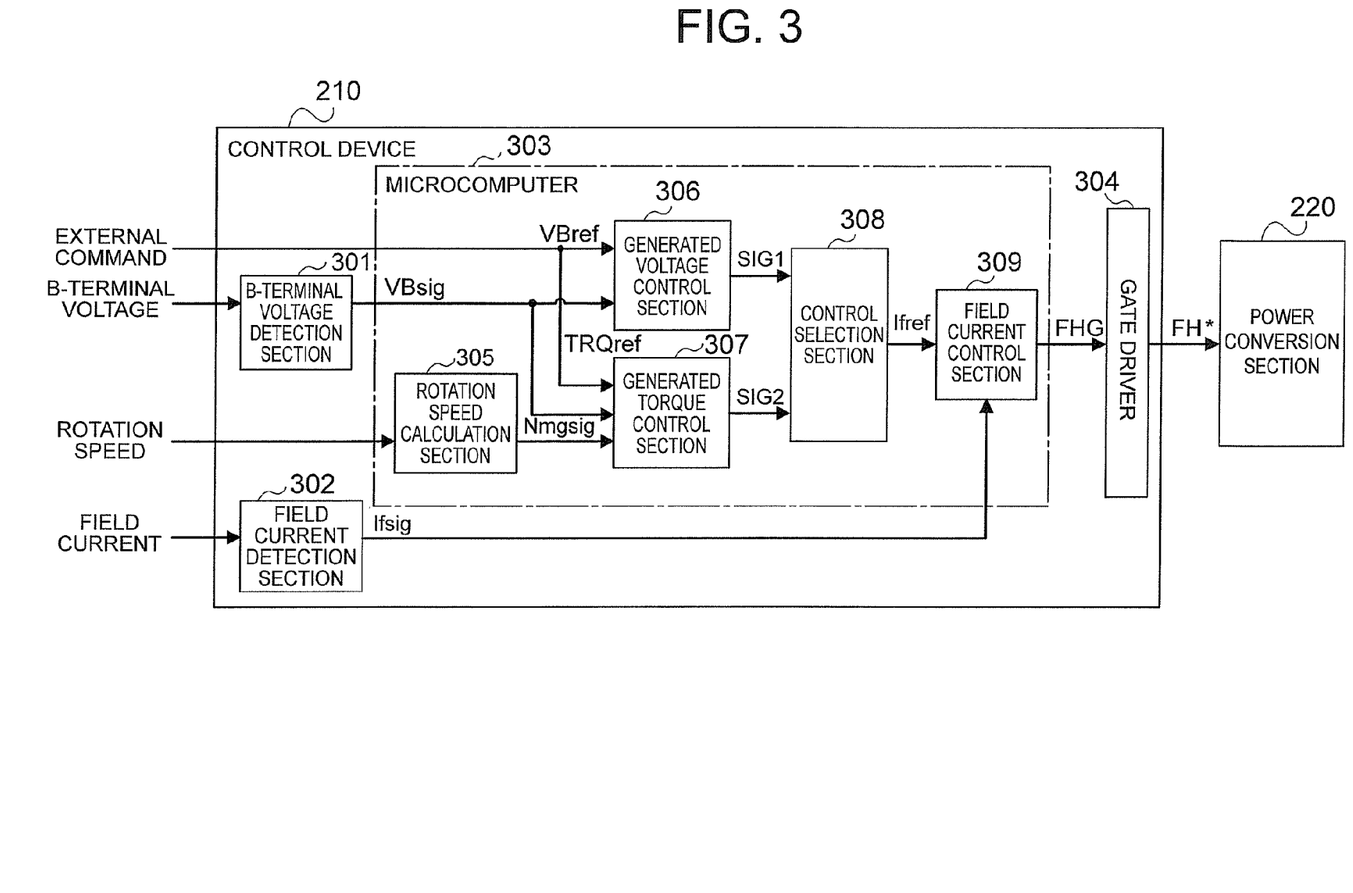
FIG. 3 is a block diagram illustrating a configuration of a control device for a power conversion apparatus according to the first embodiment of the present invention.

FIG. 1 is an overall explanatory diagram of a vehicle system in which a field winding type generator-motor as a rotary electric machine is mounted on a vehicle. FIG. 2 is a configuration diagram illustrating a configuration of a generator-motor including a control device for a vehicle power converter according to a first embodiment of the present invention. FIG. 3 is a block diagram illustrating a configuration of a control device for a power conversion apparatus according to the first embodiment of the present invention.

In FIG. 1, an internal combustion engine 101 is connected to a generator-motor 102 through an intermediation of, for example, power transmission means 104 such as a belt. In operation, the internal combustion engine 101 charges a battery (or capacitor) 103 with electric energy after AC to DC conversion performed by the generator-motor 102.

In FIG. 2, the generator-motor 102 includes a power conversion apparatus 110 and a motor-generator section 200. The power conversion apparatus 110 includes a power conversion section 220 and a control device 210 for controlling ON/OFF of switching elements.

The power conversion section 220 includes a field switching element 221, a free wheel diode 222, three-phase upper-arm switching elements 223a, 223b, and 223c, and three-phase lower-arm switching elements 224a, 224b, and 224c. The field switching element 221 performs PWM control on a field current flowing through a field winding 202. The free wheel diode 222 is connected in series to the field switching element 221. The three-phase upper-arm switching elements 223a to 223c each include a parasitic diode. The three-phase lower-arm switching elements 224a to 224c each include a parasitic diode similarly.

A B-terminal for a positive power input from the battery 103 is connected to each of the three-phase upper-arm switching elements 223a to 223c. In addition, the U-phase, V-phase, and W-phase terminals of the three-phase winding 201 of the motor-generator section 200 are respectively connected to the three-phase upper-arm switching elements 223a to 223c. A GND terminal for an earth input from the battery 103 is connected to the three-phase lower-arm switching elements 224a to 224c. In addition, the U-phase, V-phase, and W-phase terminals of the three-phase winding 201 are respectively connected to the three-phase lower-arm switching elements 224a to 224c.

Note that, in FIG. 2, the motor-generator section 200 is illustrated as a three-phase field winding type generator-motor including the three-phase winding 201 and the field winding 202. However, the number of phases and winding type of the motor-generator section 200 may be other than those of FIG. 2. Further, the generator-motor 102 is constituted as an integrated type generator-motor including the power conversion apparatus 110 and the motor-generator section 200 which are provided in an integrated manner. Alternatively, the generator-motor 102 may also be a separate type generator-motor apparatus including the power conversion apparatus 110 and the motor-generator section 200 which are provided to be physically separated from each other.

Next, description is given referring to FIG. 3 illustrating an internal configuration of the control device 210. The control device 210 includes a B-terminal voltage detection section 301, a field current detection section 302, a microcomputer 303, and a gate driver 304. Further, the microcomputer 303 includes a rotation speed calculation section 305, a generated voltage control section 306, a generated torque control section 307, a control selection section 308, and a field current control section 309. The control device 210 and the microcomputer 303 have various functions of the vehicle power converter other than those illustrated in FIG. 3, but FIG. 3 illustrates only the parts relating to the present invention.

The B-terminal voltage detection section 301 detects a voltage VB (hereinafter, referred to as "B-terminal voltage") at a positive pole-side terminal B using a potential at the negative pole-side terminal GND of the power conversion section 220 as a reference potential. The B-terminal voltage detection section 301 inputs the AD input obtained by the conversion to the microcomputer 303. The field current detection section 302 detects a current If flowing through the field winding 202 by the current sensor 203. After converting the voltage value as a sensor value into the AD input range of the microcomputer 303, the field current detection section 302 inputs the AD input obtained by the conversion to the microcomputer 303.

The rotation speed calculation section 305 detects a rotation speed of the generator-motor 102. The generated voltage control section 306 controls a generated voltage of the generator-motor 102. The generated torque control section 307 controls torque generated by the generator-motor 102. The control selection section 308 chooses one of a control output of the generated voltage control section 306 and a control output of the generated torque control section 307. The field current control section 309 controls a field current of the generator-motor 102.

The gate driver 304 operates gates of the switching elements 221, 223a to 223c, and 224a to 224c of the power conversion section 220 based on a gate signal determined by the microcomputer 303 to cause the switching elements 221, 223a to 223c, and 224a to 224c to perform switching.

At the time of power generation operation, the microcomputer 303 controls the supply of the field current in accordance with the operation of the generator-motor 102, and outputs a PWM signal to the gate driver 304 so as to obtain a desired generated voltage or desired generated torque.

For example, in the mode of controlling the generated voltage of the generator-motor 102, in order to control the voltage at the B-terminal as an input/output terminal (B-terminal voltage) so as to be a generated voltage command, the generated voltage control section 306 performs voltage feedback control by means of a generated voltage command VBref and a B-terminal voltage VBsig to calculate a field current command Ifref.

As for the field current command Ifref that has been input to the field current control section 309 via the control selection section 308, the field current control section 309 performs feedback control on the field current If detected by the field current detection section 302 and outputs a PWM signal following the field current command Ifref. Based on the PWM signal, the gate driver 304 turns ON/OFF the field switching element 221 to supply the field current. In this manner, the generated voltage is controlled so as to follow the generated voltage command VBref.

In the mode of controlling the generated torque of the generator-motor 102, on the other hand, in order to supply the field current so that the generated torque may be a generated torque command, the generated torque control section 307 calculates a field current command Ifref corresponding to a generated torque command TRQref based on the generated torque command TRQref, a rotation speed Nmgsig output from the rotation speed calculation section 305, and the B-terminal voltage VBsig.

As for the field current command Ifref that has been input to the field current control section 309 via the control selection section 308, the field current control section 309 performs feedback control on the field current If detected by the field current detection section 302 and outputs a PWM signal following the field current command Ifref. Based on the PWM signal, the gate driver 304 turns ON/OFF the field switching element 221 to supply the field current. In this manner, the generated torque is controlled so as to follow the generated torque command TRQref.

In this way, in the microcomputer 303, the generated voltage control section 306 and the generated torque control section 307 respectively control the generated voltage and the generated torque to be desired values. Such control may be attained using other known technologies instead.

Figure 4:
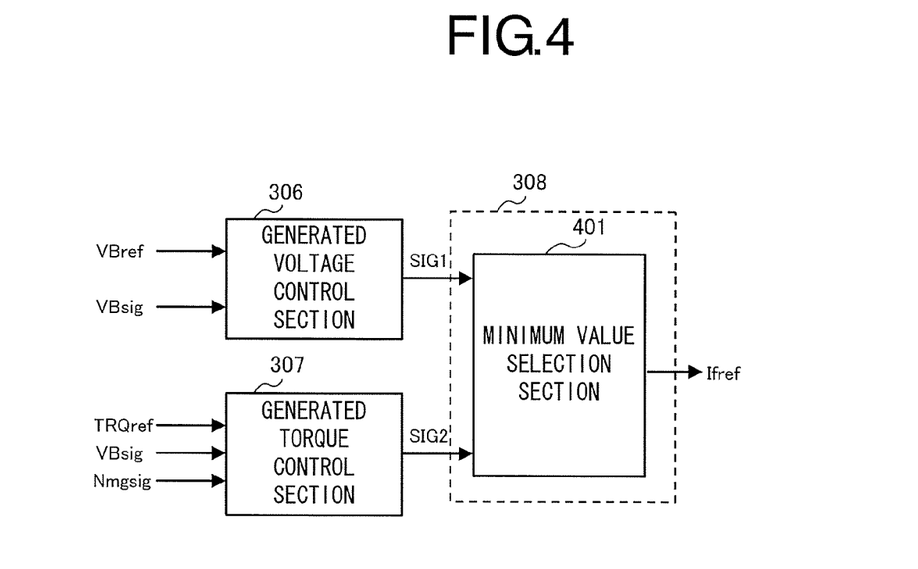
FIG. 4 is a block diagram illustrating a main configuration of microcomputer control according to the first embodiment of the present invention.

Referring to FIG. 4, the control selection section 308 receives the control output of the generated voltage control section 306 and the control output of the generated torque control section 307 as its inputs, and chooses any one of the control outputs. The control selection section 308 according to the first embodiment of the present invention inputs a control output SIG1 of the generated voltage control section 306 and a control output SIG2 of the generated torque control section 307 to a minimum value selection section 401, and outputs a minimum value between the control outputs SIG1 and SIG2.

For example, when the control output SIG1 of the generated voltage control section 306 is smaller than the control output SIG2 of the generated torque control section 307, the control output SIG1 of the generated voltage control section 306 is the output of the minimum value selection section 401, and the generator-motor 102 operates based on the control output SIG1 of the generated voltage control section 306. That is, in this case, in the generator-motor 102, the B-terminal voltage VBsig is controlled so as to follow the generated voltage command VBref.

On the other hand, when the control output SIG1 of the generated voltage control section 306 is larger than the control output SIG2 of the generated torque control section 307, the control output SIG2 of the generated torque control section 307 is the output of the minimum value selection section 401, and the generator-motor 102 operates based on the control output SIG2 of the generated torque control section 307 so that the generated torque may follow the generated torque command TRQref. That is, the generator-motor 102 generates torque based on the generated torque command TRQref.

As described above, by outputting the minimum value between the control output SIG1 of the generated voltage control section 306 and the control output SIG2 of the generated torque control section 307, it is possible to set an upper limit value of the torque generated during the generated voltage control. Therefore, by setting allowable generated torque for power generation operation of the generator-motor 102, it is possible to limit the generated torque to a suppression target value during the generated voltage control. Thus, when the generated torque becomes equal to or larger than set generated torque, the generator-motor 102 operates so as to suppress the generated torque.

Also in the reverse case, it is possible to set an upper limit value of the voltage generated during the generated torque control. Therefore, by setting an allowable generated voltage for power generation operation of the generator-motor 102, it is possible to limit the generated voltage to a suppression target value during the generated torque control. Thus, when the B-terminal voltage becomes equal to or larger than a set generated voltage, the generator-motor 102 operates so as to suppress the generated voltage.

Figure 5:
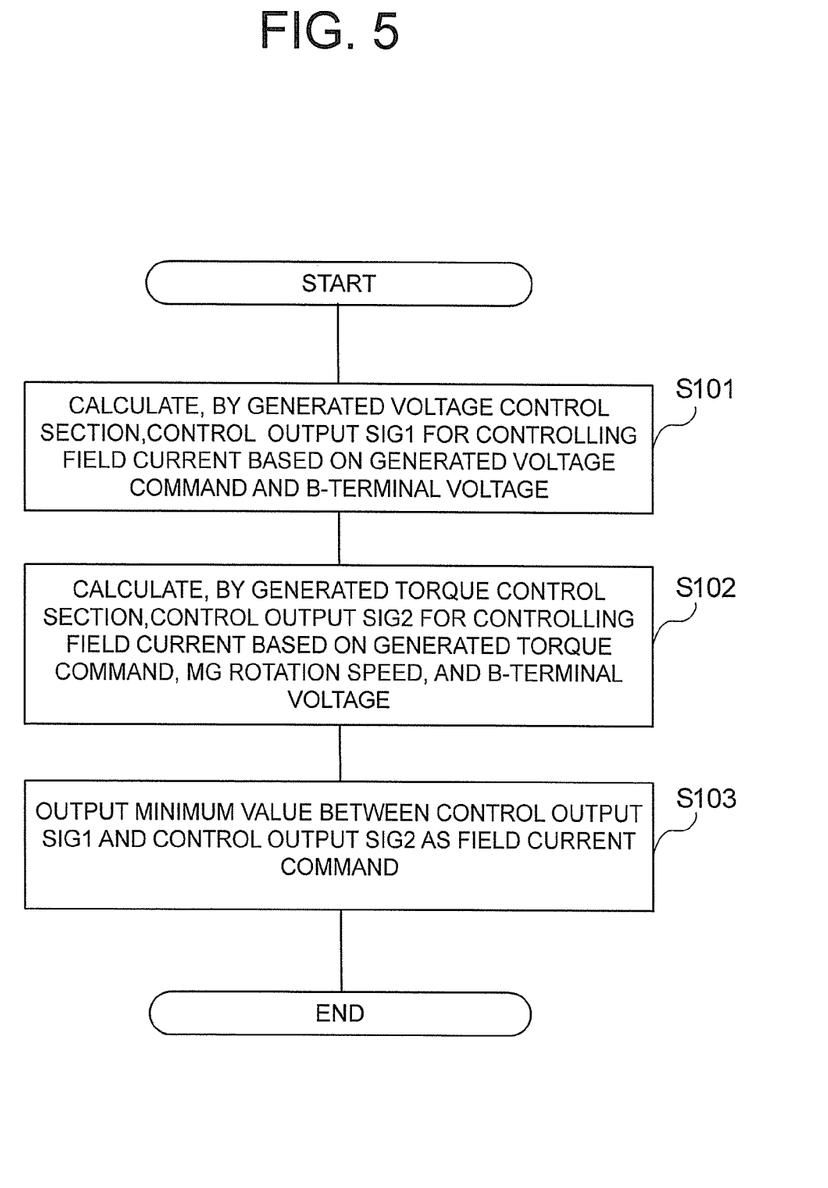
FIG. 5 is a flowchart illustrating an operation of a microcomputer according to the first embodiment of the present invention.

FIG. 5 is a flowchart illustrating an operation of the microcomputer 303 according to the first embodiment of the present invention. First, the generated voltage control section 306 calculates the control output SIG1 for controlling the field current based on the generated voltage command VBref and the B-terminal voltage VBsig (Step S101).

Subsequently, the generated torque control section 307 calculates the control output SIG2 for controlling the field current based on the generated torque command TRQref, the rotation speed, and the B-terminal voltage VBsig (Step S102).

Next, the minimum value selection section 401 compares the control output SIG1 from the generated voltage control section 306 and the control output SIG2 from the generated torque control section 307 to each other, and outputs the minimum value therebetween as the field current command Ifref (Step S103). The processing of FIG. 5 is then terminated.

In this way, by choosing the minimum value between the control output SIG1 of the generated voltage control section 306 and the control output SIG2 of the generated torque control section 307, it is possible to provide the generator-motor 102 with an upper limit of the generated torque at the time of generated voltage control or an upper limit of the generated voltage at the time of generated torque control, to thereby prevent an excessive generated voltage or excessive generated torque.

As described above, according to the first embodiment, the control selection section chooses and outputs one of the control output of the generated voltage control section for controlling the field current so that the B-terminal voltage of the polyphase AC generator-motor coincides with the generated voltage command and the control output of the generated torque control section for controlling the field current based on the B-terminal voltage and the rotation speed so that the generated torque of the polyphase AC generator-motor coincides with the generated torque command.

Therefore, in a field winding type synchronous generator-motor including a field winding, by calculating the control output for generated voltage control and the control output for generated torque control in parallel and outputting the minimum value therebetween, it is possible to provide an upper limit of the generated voltage or the generated torque, to thereby prevent the occurrence of an overvoltage or excessive torque during power generation.

Second Embodiment

In the above-mentioned first embodiment, an overvoltage and excessive torque during power generation are suppressed by choosing the minimum value between the control output SIG1 of the generated voltage control section 306 and the control output SIG2 of the generated torque control section 307. In the generated torque control mode, however, if power generation is continued under small generated torque, the load may increase more than supplied power of the generator-motor 102 to lower the generated voltage, resulting in a low voltage.

In a second embodiment of the present invention aimed at addressing the problem, a method of preventing that the generated voltage becomes a low voltage is described. Note that, in the second embodiment, the difference from the above-mentioned first embodiment is described, and description of the same configuration and operation as those of the first embodiment is omitted.

Figure 6:
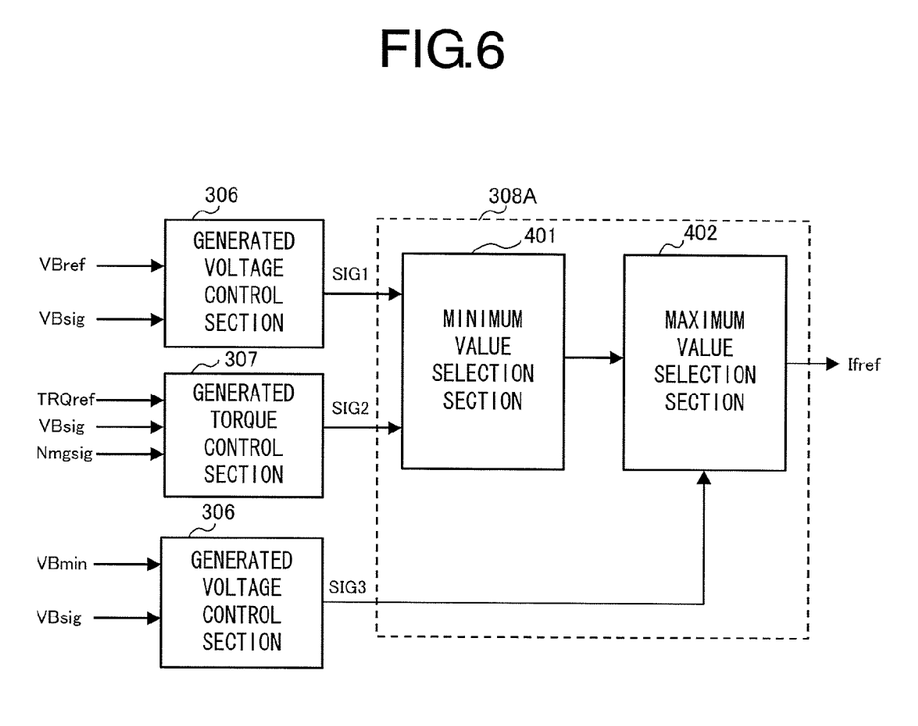
FIG. 6 is a block diagram illustrating a main configuration of microcomputer control according to a second embodiment of the present invention.

FIG. 6 is a block diagram illustrating a main configuration of microcomputer control according to the second embodiment of the present invention. Referring to FIG. 6, a control selection section 308A includes a minimum value selection section 401 and a maximum value selection section 402. Similarly to the first embodiment, the minimum value selection section 401 outputs the minimum value between the control output SIG1 of the generated voltage control section 306 and the control output SIG2 of the generated torque control section 307.

The maximum value selection section 402 receives, as its inputs, the output of the minimum value selection section 401 and a control output SIG3 of the generated voltage control section 306 calculated from a lower limit value of the generated voltage of the generator-motor 102 and the B-terminal voltage, and outputs the maximum value between the inputs. Note that, the lower limit value of the generated voltage may be set as a lower limit value of the generated voltage of the generator-motor 102 and may be set as a minimum generated voltage to be maintained during the generated torque control.

For example, when the control output SIG1 of the generated voltage control section 306 is larger than the control output SIG2 of the generated torque control section 307, the control output SIG2 of the generated torque control section 307 becomes the output of the minimum value selection section 401. Further, the control output SIG3 for maintaining the lower limit value of the generated voltage is calculated by the generated voltage control section 306, and is compared to the output of the minimum value selection section 401 in the maximum value selection section 402. Then, a maximum value therebetween is output.

Specifically, when the control output SIG2 of the generated torque control section 307 is larger than the control output SIG3 for maintaining the lower limit value of the generated voltage calculated by the generated voltage control section 306, the generated torque control is maintained. In contrast, when the control output SIG2 of the generated torque control section 307 is lower than the control output SIG3 for maintaining the lower limit value of the generated voltage calculated by the generated voltage control section 306, the control device operates so as to maintain the lower limit value of the generated voltage.

Figure 7:
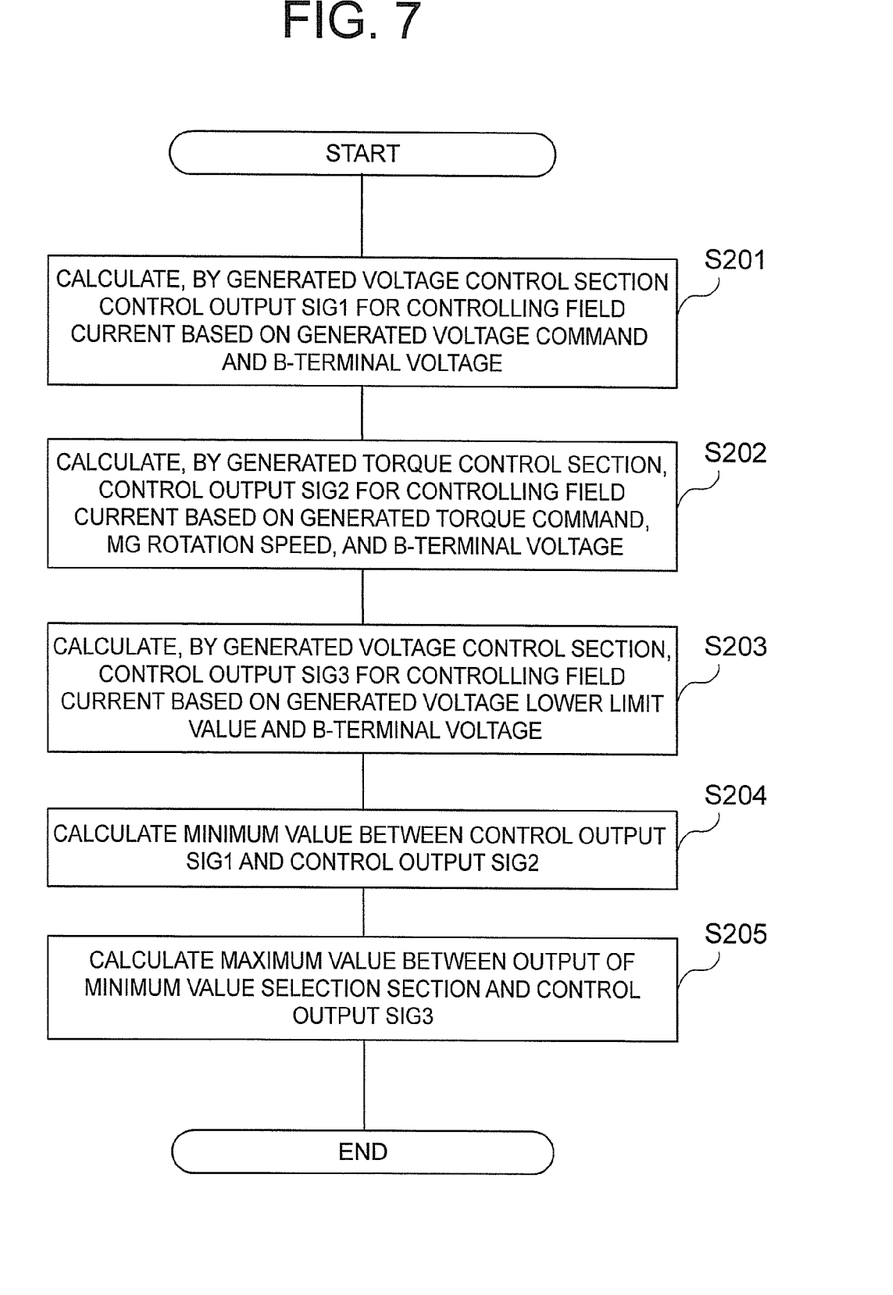
FIG. 7 is a flowchart illustrating an operation of a microcomputer according to the second embodiment of the present invention.

FIG. 7 is a flowchart illustrating an operation of the microcomputer 303 according to the second embodiment of the present invention. First, the generated voltage control section 306 calculates the control output SIG1 for controlling the field current based on the generated voltage command VBref and the B-terminal voltage VBsig (Step S201).

Subsequently, the generated torque control section 307 calculates the control output SIG2 for controlling the field current based on the generated torque command TRQref, the rotation speed, and the B-terminal voltage VBsig (Step S202).

Next, the generated voltage control section 306 calculates the control output SIG3 for controlling the field current based on a generated voltage lower limit value VBmin and the B-terminal voltage VBsig (Step S203).

Subsequently, the minimum value selection section 401 compares the control output SIG1 from the generated voltage control section 306 and the control output SIG2 from the generated torque control section 307 to each other, and outputs a minimum value therebetween (Step S204).

Next, the maximum value selection section 402 compares the output of the minimum value selection section 401 and the control output SIG3 of the generated voltage control section 306 to each other, and outputs a maximum value therebetween as the field current command Ifref (Step S205). The processing of FIG. 7 is then terminated.

As described above, according to the second embodiment, by outputting the maximum value between the minimum value between the control output SIG1 of the generated voltage control section 306 and the control output SIG2 of the generated torque control section 307, and the control output SIG3 of the generated voltage control section 306 for maintaining the lower limit value of the generated voltage, it is possible to set an upper value and a lower value of the voltage generated at the time of generated torque control. Therefore, when the generated torque control is performed, the generator-motor 102 can be subjected to the generated torque control in the range between the upper and lower limits of the generated voltage. Thus, the occurrence of a low voltage or an overvoltage of the generated voltage can be prevented.

Note that, in the above-mentioned second embodiment, the minimum value between the control output SIG1 of the generated voltage control section 306 and the control output SIG2 of the generated torque control section 307 is calculated, and thereafter the maximum value between the control output SIG3, which is calculated by the generated voltage control section 306 based on the generated voltage lower limit value VBmin, and the output of the minimum value selection section 401 is calculated. However, the present invention is not limited to this order of calculation. The same effects can be obtained by a configuration in which a maximum value between the control output SIG3, which is calculated by the generated voltage control section 306 based on the generated voltage lower limit value VBmin, and the control output of the generated torque control section 307 is calculated and compared to the control output SIG1 of the generated voltage control section 306, and thereafter a minimum value therebetween is output.

Third Embodiment

In the above-mentioned second embodiment, the minimum value between the control output SIG1 of the generated voltage control section 306 and the control output SIG2 of the generated torque control section 307 is chosen, and further, the control output SIG3 is calculated by the generated voltage control section 306 based on the lower limit value of the generated voltage and the B-terminal voltage and is then compared to the output of the minimum value selection section 401. Then, the maximum value therebetween is output. The second embodiment therefore has a problem of the increased calculation amount in the microcomputer 303.

In a third embodiment of the present invention aimed at addressing the problem, a method of reducing the calculation amount in the microcomputer is described. Specifically, a method of reducing the calculation load in the microcomputer by switching calculation contents in accordance with the B-terminal voltage and thereby reducing the calculation amount in the microcomputer is described.

Figure 8:
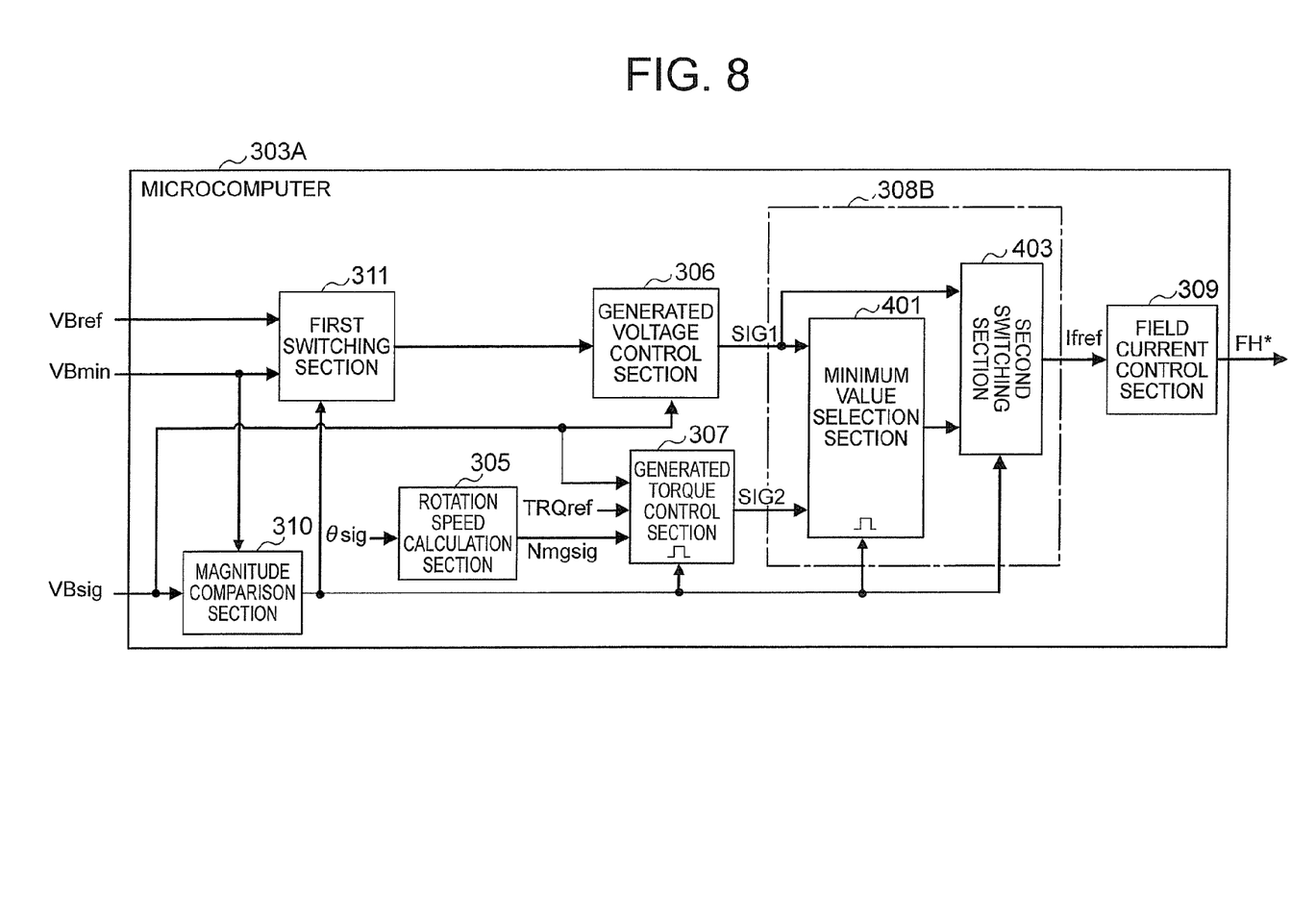
FIG. 8 is a block diagram illustrating a configuration of microcomputer control according to a third embodiment of the present invention.

FIG. 8 is a block diagram illustrating a configuration of microcomputer control according to the third embodiment of the present invention. Referring to FIG. 8, a microcomputer 303A includes a magnitude comparison section 310, a first switching section 311, the rotation speed calculation section 305, the generated voltage control section 306, the generated torque control section 307, a control selection section 308B, and the field current control section 309. The control selection section 308B includes the minimum value selection section 401 and a second switching section 403.

The magnitude comparison section 310 compares the B-terminal voltage VBsig and the generated voltage lower limit value VBmin to each other, and outputs "1" when the B-terminal voltage VBsig is larger than the generated voltage lower limit value VBmin and "0" when the B-terminal voltage VBsig is smaller than the generated voltage lower limit value VBmin.

The first switching section 311 receives the generated voltage command VBref and the generated voltage lower limit value VBmin as its inputs, and switches its output in accordance with the output of the magnitude comparison section 310. Specifically, when the output of the magnitude comparison section 310 is "1" (VBmin≤VBsig), the first switching section 311 outputs the generated voltage command VBref. When the output of the magnitude comparison section 310 is "0" (VBmin>VBsig), on the other hand, the first switching section 311 outputs the generated voltage lower limit value VBmin.

The generated voltage control section 306 calculates the field current command Ifref that the B-terminal voltage VBsig follows, with the output of the first switching section 311 being a target value. The generated torque control section 307 calculates the field current command Ifref based on the generated torque command TRQref, the B-terminal voltage VBsig, and the rotation speed Nmgsig output from the rotation speed calculation section 305.

Note that, the generated torque control section 307 determines whether to execute the calculation in accordance with the output of the magnitude comparison section 310, and calculates the control output SIG2 when the output of the magnitude comparison section 310 is "1" (VBmin≤VBsig) and does not calculate the control output SIG2 when the output of the magnitude comparison section 310 is "0" (VBmin>VBsig).

The minimum value selection section 401 compares the control output SIG1 of the generated voltage control section 306 and the control output SIG2 of the generated torque control section 307 to each other, and outputs the minimum value therebetween. Note that, the minimum value selection section 401 determines whether to execute the calculation in accordance with the output of the magnitude comparison section 310, and calculates the minimum value when the output of the magnitude comparison section 310 is "1" (VBmin≤VBsig) and does not calculate the minimum value when the output of the magnitude comparison section 310 is "0" (VBmin>VBsig).

The second switching section 403 outputs any one of the output of the minimum value selection section 401 and the control output SIG1 of the generated voltage control section 306 in accordance with the output of the magnitude comparison section 310. Specifically, when the output of the magnitude comparison section 310 is "1" (VBmin≤VBsig), the second switching section 403 outputs the output of the minimum value selection section 401. At this time, in the generated voltage control section 306, the control output SIG1 is calculated with the generated voltage command VBref being a target value.

On the other hand, when the output of the magnitude comparison section 310 is "0" (VBmin>VBsig), the second switching section 403 outputs the control output SIG1 of the generated voltage control section 306. At this time, in the generated voltage control section 306, the control output SIG1 is calculated with the generated voltage lower limit value VBmin being a target value, and the B-terminal voltage VBsig is controlled so as not to be equal to or smaller than the generated voltage lower limit value VBmin.

Figure 9:
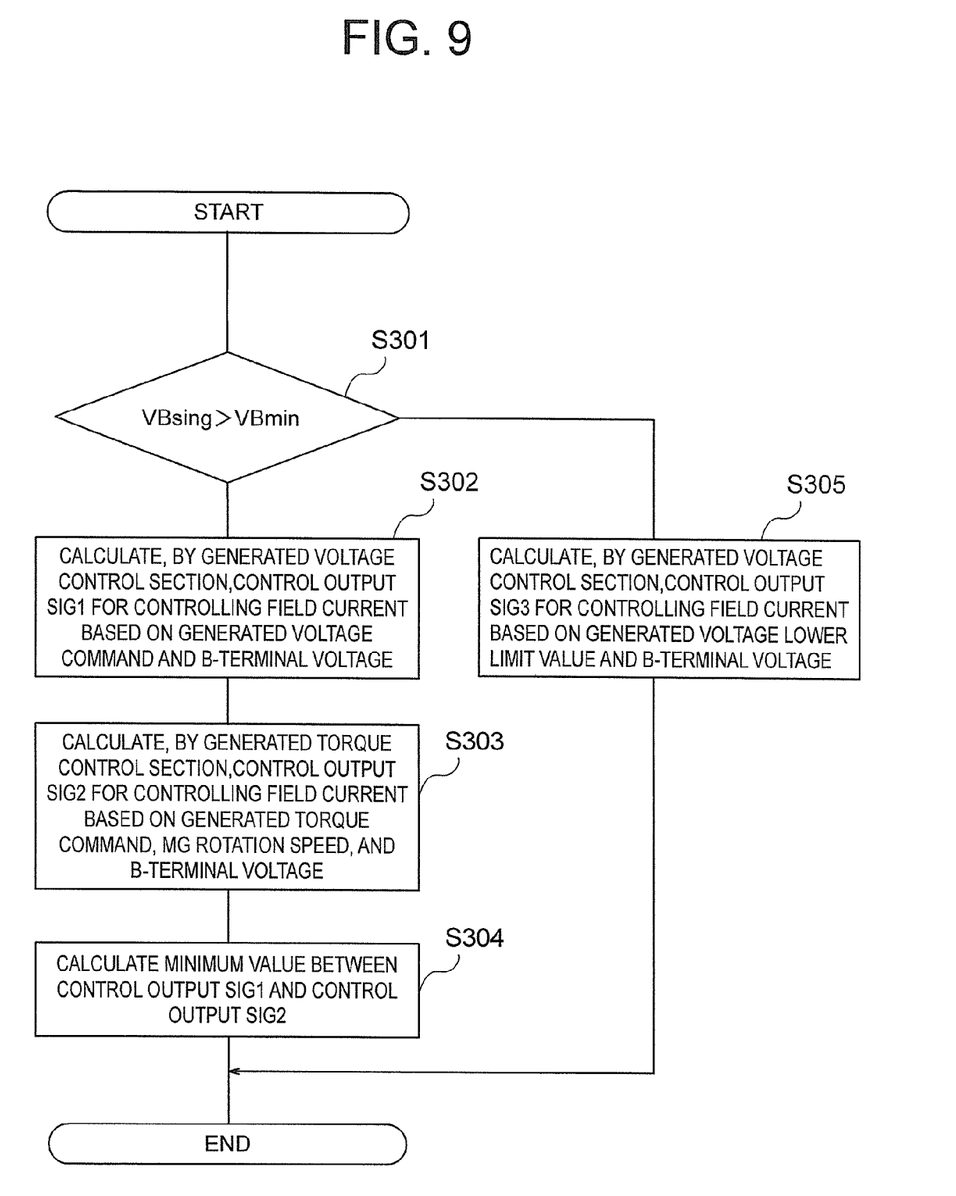
FIG. 9 is a flowchart illustrating an operation of a microcomputer according to the third embodiment of the present invention.

FIG. 9 is a flowchart illustrating an operation of the microcomputer 303A according to the third embodiment of the present invention. First, the magnitude comparison section 310 compares the B-terminal voltage VBsig and the generated voltage lower limit value VBmin to each other, and determines whether or not the B-terminal voltage VBsig is larger than the generated voltage lower limit value VBmin (Step S301).

When it is determined in Step S301 that the B-terminal voltage VBsig is larger than the generated voltage lower limit value VBmin (i.e., Yes), the generated voltage control section 306 calculates the control output SIG1 for controlling the field current, with the generated voltage command VBref being a target value (Step S302).

Subsequently, the generated torque control section 307 calculates the control output SIG2 for controlling the field current based on the generated torque command TRQref, the B-terminal voltage VBsig, and the rotation speed Nmgsig of the generator-motor 102 (Step S303).

Next, the control selection section 308B outputs, as the output of the control selection section 308B, the minimum value between the control output SIG1 of the generated voltage control section 306 and the control output SIG2 of the generated torque control section 307, which is output from the minimum value selection section 401 (Step S304). The processing of FIG. 9 is then terminated.

On the other hand, when it is determined in Step S301 that the B-terminal voltage VBsig is equal to or smaller than the generated voltage lower limit value VBmin (i.e., No), the generated voltage control section 306 calculates the control output SIG3 for controlling the field current based on the generated voltage lower limit value VBmin and the B-terminal voltage VBsig, and the control selection section 308B outputs the calculated control output SIG3 as the output of the control selection section 308B (Step S305). The processing of FIG. 9 is then terminated.

As described above, according to the third embodiment, the operation contents are switched in accordance with the generated voltage lower limit value VBmin and the B-terminal voltage VBsig, to thereby reduce the calculation amount in the microcomputer 303A. Thus, the calculation load in the microcomputer 303A can be reduced.

In this way, by choosing the minimum value between the control output SIG1 of the generated voltage control section 306 corresponding to the generated voltage command VBref and the control output SIG2 of the generated torque control section 307 corresponding to the generated torque command TRQref, it is possible to set an upper limit value of one of the generated voltage and the generated torque. Thus, the occurrence of an overvoltage or excessive torque can be prevented during power generation.

In addition, by setting, as a control output, the maximum value between the control output SIG3 of the generated voltage control section 306 calculated from the generated voltage lower limit value VBmin and the output of the minimum value selection section 401, it is possible to set a lower limit value of the generated voltage. Thus, the occurrence of an overvoltage, a low voltage, or excessive torque can be prevented during power generation.

Besides, by switching control in accordance with the B-terminal voltage VBsig, it is possible to reduce the operation load in the microcomputer 303A.

Note that, in the above-mentioned first to third embodiments, the control outputs of the generated voltage control section 306 and the generated torque control section 307 are represented by the field current command Ifref, but the present invention is not limited thereto and the control outputs may be a duty ratio of a PWM signal applied to the field coil. In this case, the output of the control selection section 308 is a PWM signal applied to the field coil, and hence the output of the control selection section 308 only needs to be input to the gate driver.

What is claimed is:

1. A control device for a power converter to be used by being connected to a polyphase AC generator-motor including an armature winding and a field winding,
the polyphase AC generator-motor comprising:
a power conversion section; and
a control device for controlling ON/OFF of switching elements of the power conversion section,
the power conversion section comprising:
a bridge circuit including positive-arm switching elements and negative-arm switching elements, for controlling energization of the armature winding; and
a field circuit for controlling energization of the field winding by using a field switching element,
the control device comprising:
a B-terminal voltage detection section for detecting a B-terminal voltage generated between a B-terminal and a reference potential, the B-terminal being an input/output terminal for power of the polyphase AC generator-motor;
a field current detection section for detecting a field current flowing through the field winding;
a rotation speed calculation section for detecting a rotation speed of the polyphase AC generator-motor;
a generated voltage control section for controlling the field current so that the B-terminal voltage of the polyphase AC generator-motor coincides with a generated voltage command;
a generated torque control section for controlling, based on the B-terminal voltage and the rotation speed, the field current so that generated torque of the polyphase AC generator-motor coincides with a generated torque command;
a control selection section for choosing any one of a control output of the generated voltage control section and a control output of the generated torque control section; and
a field current control section for controlling the field current so that the field current coincides with an output of the control selection section,
wherein the control selection section comprises a minimum value selection section for choosing and outputting a minimum value between the control output of the generated voltage control section and the control output of the generated torque control section.

2. A control device for a power converter according to claim 1, wherein the control selection section further comprises a maximum value selection section for choosing and outputting a maximum value between the output of the minimum value selection section and another control output of the generated voltage control section for maintaining a lower limit value of a generated voltage of the polyphase AC generator-motor at a time of power generation operation.

3. A control device for a power converter according to claim 1, further comprising:
- a magnitude comparison section for comparing magnitudes between the B-terminal voltage and a lower limit value of a generated voltage of the polyphase AC generator-motor at a time of power generation operation; and
- a first switching section for switching a command value, which is input to the generated voltage control section, to one of an external generated voltage command and the lower limit value of the generated voltage,
- wherein the control selection section further comprises a second switching section for switching, in accordance with an output of the magnitude comparison section, between the output of the minimum value selection section and the control output of the generated voltage control section and outputting the switched output,
- wherein, when the B-terminal voltage is larger than the lower limit value of the generated voltage, the magnitude comparison section enables calculation of the generated torque control section, and the second switching section outputs the minimum value between the control output of the generated voltage control section and the control output of the generated torque control section, and
- wherein, when the B-terminal voltage is smaller than the lower limit value of the generated voltage, the first switching section disables the calculation of the generated torque control section, and the second switching section outputs another control output of the generated voltage control section to which the B-terminal voltage and the lower limit value of the generated voltage are input.

4. A control method for a power converter to be used by being connected to a polyphase AC generator-motor including an armature winding and a field winding, the control method comprising:
- a B-terminal voltage detection step of detecting a B-terminal voltage generated between a B-terminal and a reference potential, the B-terminal being an input/output terminal for power of the polyphase AC generator-motor;
- a field current detection step of detecting a field current flowing through the field winding;
- a rotation speed calculation step of detecting a rotation speed of the polyphase AC generator-motor;
- a generated voltage control step of controlling the field current so that the B-terminal voltage of the polyphase AC generator-motor coincides with a generated voltage command;
- a generated torque control step of controlling, based on the B-terminal voltage and the rotation speed, the field current so that generated torque of the polyphase AC generator-motor coincides with a generated torque command;
- a control selection step of choosing any one of a control output in the generated voltage control step and a control output in the generated torque control step; and
- a field current control step of controlling the field current so that the field current coincides with an output in the control selection step,
- wherein the control selection step comprises a minimum value selection step of choosing and outputting a minimum value between the control output in the generated voltage control step and the control output in the generated torque control step.

* * * * *